Patented June 14, 1927.

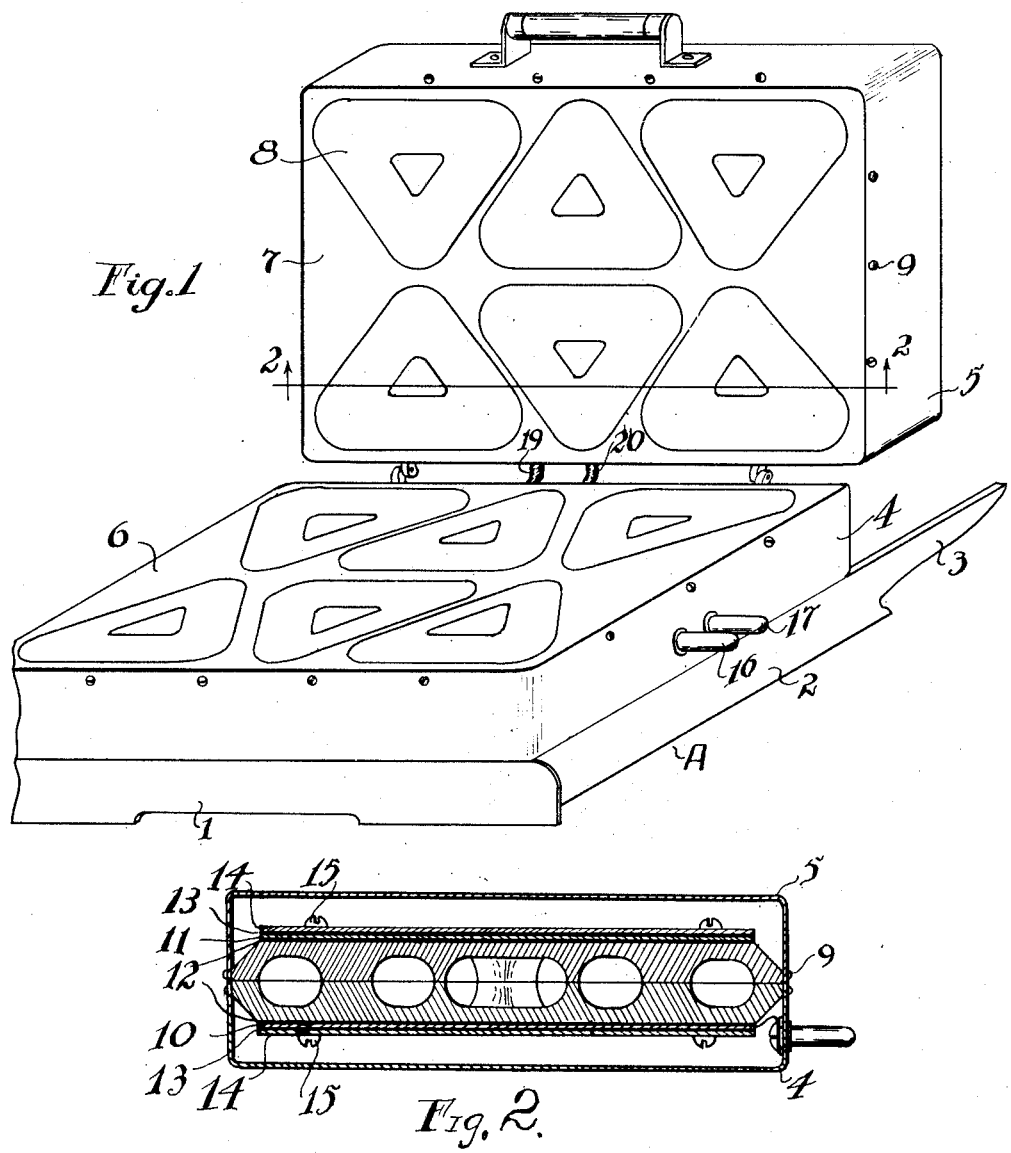

1,632,115

UNITED STATES PATENT OFFICE.

JOHN A. BURRICHTER, OF ST. PAUL, MINNESOTA.

GREASELESS-DOUGHNUT MACHINE.

Application filed February 2, 1925. Serial No. 6,215.

The present invention relates to a device for making greaseless doughnuts.

In the making of doughnuts it has heretofore been necessary to plunge a portion of dough, cut to a desired shape, into a quantity of heated grease in order to cook the doughnut.

An object of the present invention is to cook doughnuts in a heated mold without the use of grease.

In order to attain this object there is provided, in accordance with one feature of the invention, a pair of plates having mold cavities therein, the mold cavities of one plate being positioned to register with those of the other when the mold plates are in relatively superposed condition. Each of the plates is provided with a heating element affixed to the rear face thereof and means are provided to connect the heating element to a suitable source of electrical current to energize said heating elements.

These and other features of the invention, not specifically mentioned, will be more fully brought out in the following description and the accompanying drawings, wherein:

Figure 1, is a view in isometric perspective of a device made in accordance with the present invention showing the device in open condition; and Figure 2, is a view in section on the line 2—2 of Figure 1, showing the parts as they would appear when closed and ready for a cooking operation.

Referring to the drawings in detail, a supporting base A is composed of portions 1 and 2 interconnected in a suitable manner, as by brazing, the side members 2 having an extension 3 extending rearwardly therefrom to support the upper portion of the mold when in an open condition. A pair of box-like housing shells 4 and 5 may be of stamped or cast metal, as desired. The lower box-like housing shell 4 may be affixed to the base A in a suitable manner, as by brazing, and into the open faces of the box-like shell members are inserted plates 6 and 7 having recesses 8 therein of triangular plan shape, and of semi-circular section, as shown in Figure 2. The plates 6 and 7 may be secured in position by means of screws 9. Heating elements 10 and 11 are affixed to the outer faces of the mold plates and are electrically separated therefrom by means of insulating sheets 12 which may be of mica. A second insulating sheet 13 is held in position between the heating element and a plate 14 which clamps the heating element in position and is held in place by means of screws 15.

Electrical current for the heating elements may be introduced through terminals 16 and 17 by means of a connecting plug of a well-known type, not shown. The circuit may be carried through the coil affixed to the lower molding plate upwardly through a flexible insulated wire 19 into the heating elements affixed to the upper molding plate and thence may be returned through a second flexible wire 20 to the other of the terminal posts. In this manner the current is supplied to both heating elements by means of a single pair of contact terminals.

The operation of the device is as follows:

A source of electrical current is connected to the heating elements and the molding plates 6 and 7 are brought to a required temperature. A quantity of batter such as is used in making doughnuts is then placed in each of the molding recesses 8 in the lower plate and the device is closed by swinging the upper mold plate down into proximity to the lower mold plate, the mold cavities in each registering with those in the other. After a sufficient time has elapsed to thoroughly cook the doughnuts, the upper portion is raised to the position shown in Figure 1 and the doughnuts removed manually from the mold cavities.

The product has all the appearance of a doughnut cooked by the old process of immersing a portion of dough in hot grease, and, except for the absence of the greasy taste, has all the flavor of doughnuts cooked by the later method.

What I claim is:

1. A machine for baking doughnuts to render the same greaseless, comprising a pair of hinged cast metal molds, said molds having similarly shaped batter-receiving depressions formed therein to receive the material to be baked, the depressions facing each other in pairs when the molds are closed and each pair being entirely separated from other pairs and shaped to produce a doughnut, said depressions further having centrally located contacting studs forming a heating unit extending throughout the center of the material to be baked, an electrical heating element secured to the outer face of a mold, and a casing for each of said molds secured to the outer edges thereof and spaced from the outer surfaces of the molds and from the outer edges of the heating elements to provide heating spaces throughout the entire area of the molds.

2. A greaseless doughnut baking apparatus, comprising a pair of hinged molds, said molds having similarly shaped depressions facing each other in pairs when the molds are closed, each pair being entirely separated from other pairs and shaped to form a doughnut, electrical heating elements secured to the outer surfaces of said molds spaced therefrom and a casing for each of said molds enclosing the heating elements and spaced from the marginal edges of the latter and secured to the outer edges of the molds whereby to provide a heating space throughout approximately the entire area of the outer surfaces of the molds.

In testimony whereof I affix my signature.

JOHN A. BURRICHTER.